Patented Mar. 1, 1927.

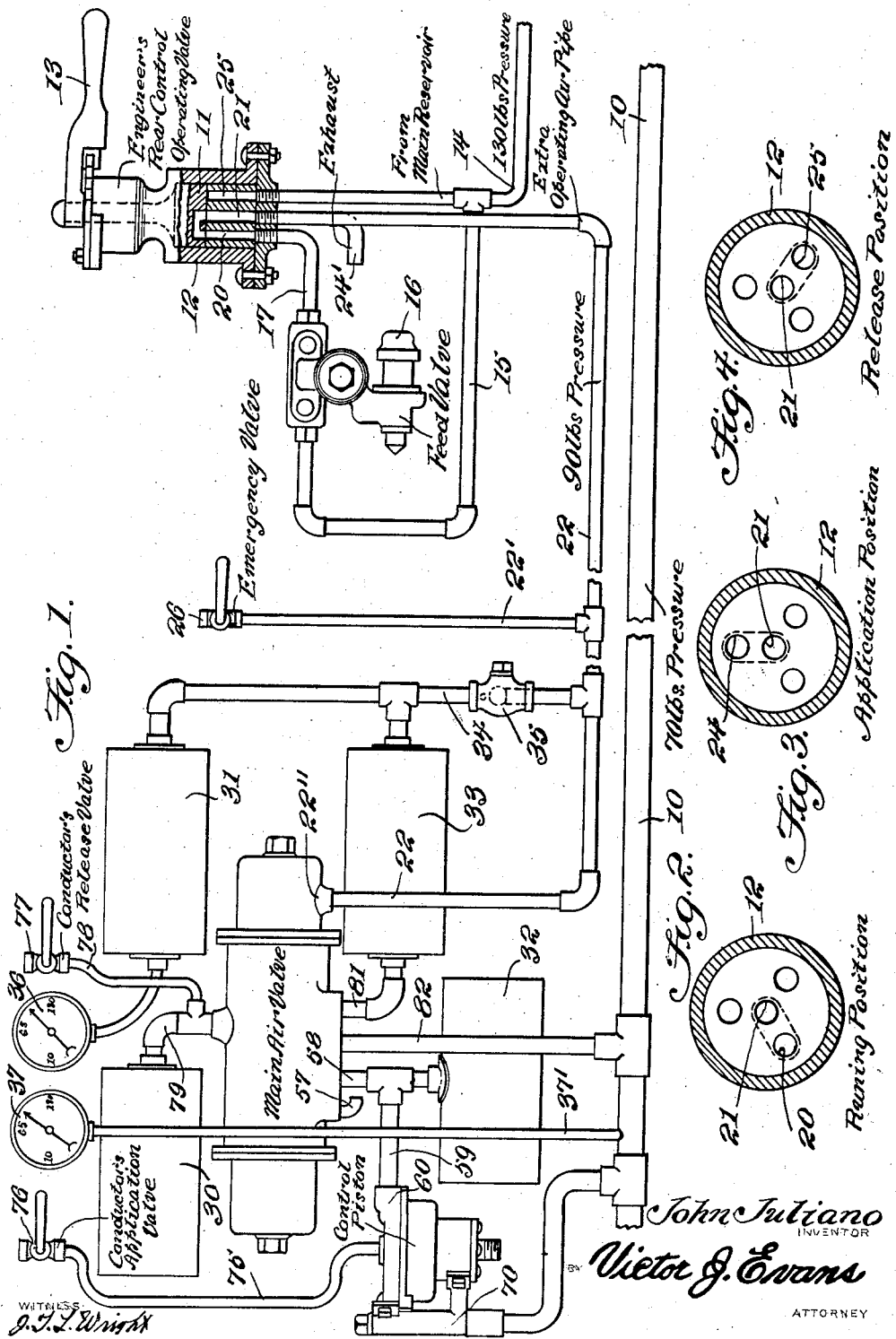

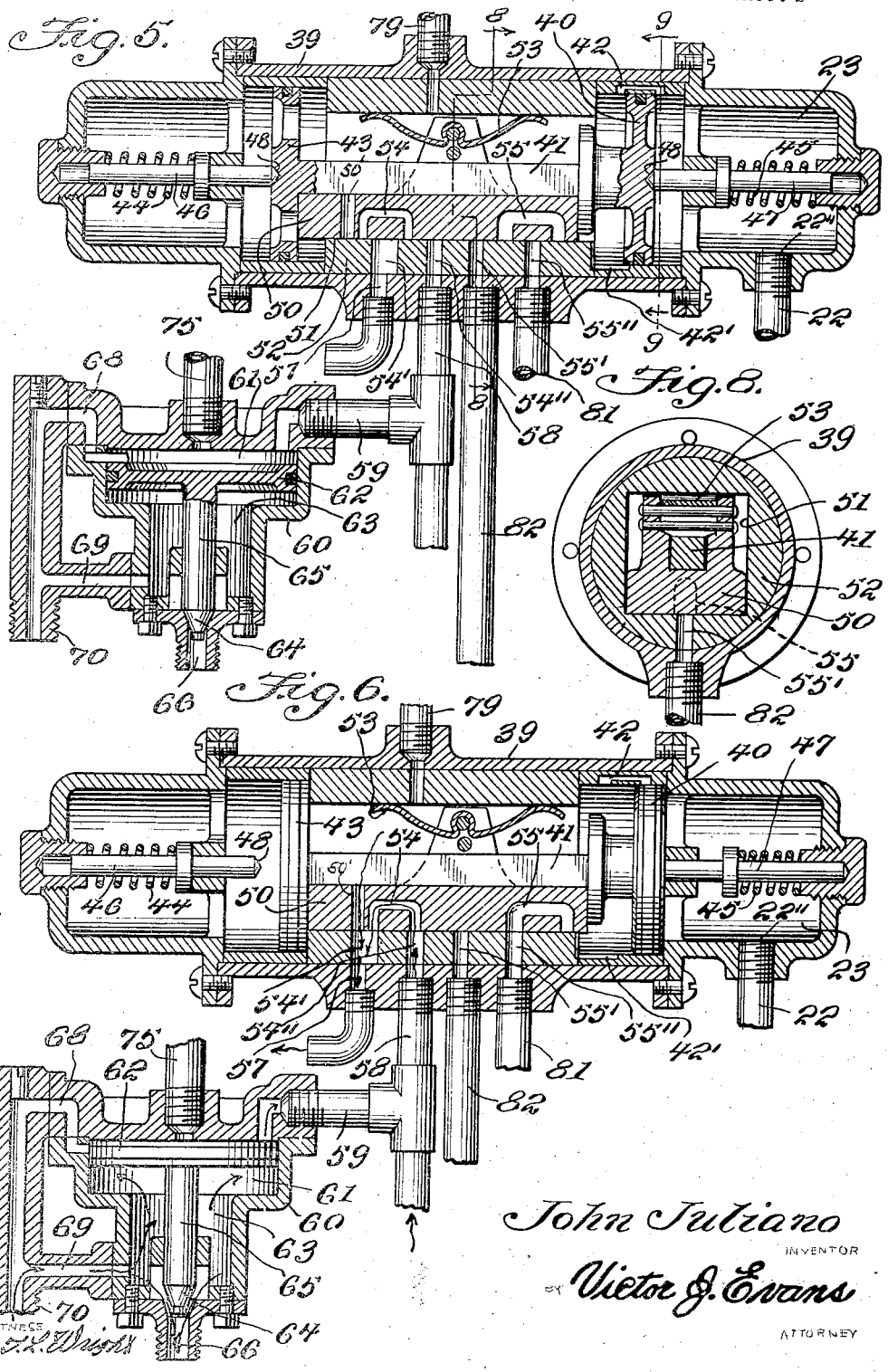

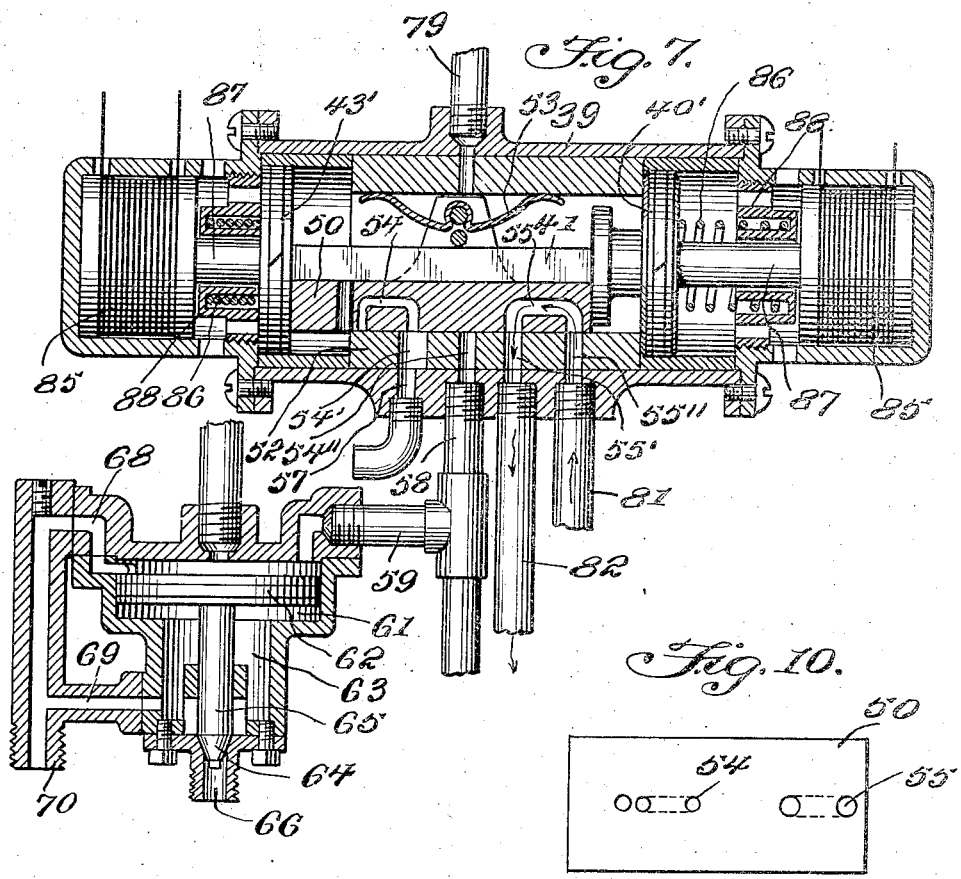

1,619,132

UNITED STATES PATENT OFFICE.

JOHN JULIANO, OF NIAGARA FALLS, NEW YORK, ASSIGNOR OF ONE-FOURTH TO JOSEPH F. BRADEN, OF NIAGARA FALLS, NEW YORK.

REAR AIR-BRAKE CONTROL.

Application filed May 8, 1926. Serial No. 107,750.

The object of this invention is to provide means enabling an engineer to control the air brakes of a train from apparatus at the rear thereof, and installed in a caboose or in a rear passenger coach, and to provide means whereby a conductor may have the same control from a point at the rear of the train, when under special conditions, such control is necessary or desirable.

A further object is to stop a train by producing reduction in air pressure first at the rear of the train line or brake pipe, so that the brake apparatus on the rear cars will first respond to the reduction in pressure, and the cars from the rear to the forward end of the train will progressively slacken their speed.

A further object is to provide a control valve connected with the brake pipe or train pipe, and adapted to reduce pressure therein when said valve is released by the engineer thru special mechanism hereinafter disclosed, or when this valve, or control valve, is released directly by the conductor at the rear of a train.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a diagrammatic view showing the principal elements of the apparatus in elevation, with a portion of the engineer's valve in section.

Figure 2 is a section thru the engineer's valve, or the casing thereof, showing the running position.

Figure 3 is a similar section showing the application position.

Figure 4 is a similar section, but showing the release position.

Figure 5 is a vertical section thru a rear main valve and housing and thru a valve controlled either by a conductor at the rear of the train, or by the engineer thru the main valve and his operating valve (not shown in this view).

Figure 6 is a view similar to Figure 5 but showing the slide valve hereinafter referred to in position for exhausting or reducing air pressure.

Figure 7 is a view in vertical section showing the release position of the valve and showing a modified form of valve operating means—involving the use of coils or solenoids, to be controlled by any suitable switch, not shown.

Figure 8 is a section on line 8—8 of Figure 5.

Figure 9 is a section on line 9—9 of Figure 5.

Figure 10 is a bottom plan view of the slide valve.

Figure 11 is a horizontal section thru a bushing forming a seat for the slide valve.

A main brake pipe or train line is designated 10, and an engineer's rear control operating valve is shown at 11, and is mounted in valve casing 12, the valve being controlled by a handle 13.

The valve body 11 is provided with several ports as illustrated in Figures 2, 3 and 4. Air under pressure of about 130 pounds is admitted thru pipes 14 and 15 thru regulating feed valve 16, and is reduced to say 90 pounds, the air flowing thru pipe 17 and ports 20 and 21 of valve 11, pipe 22, and thence to chamber 23 of the valve described below. This position of valve 11 constitutes the running position, and is shown in Figure 2.

In the application position of valve 11, shown in Figure 3, air flows thru port 21 to the exhaust port 24 and exhaust pipe 24'.

In the release position, communication is established between ports 25 and 21. An emergency valve 26 is connected with pipe 22 by branch pipe 22'.

In the apparatus to be installed in the caboose or in the rear car of a train, a plurality of air tanks or cylinders 30, 31, 32, 33, is provided, for reserve air supply, and pipe 34 including a check valve 35 extends from pipe 22 to air tank 33 and also to air tank 31, the latter having connected therewith a gage 36, while brake pipe 10 is connected thru pipe 37' with a gage 37.

A main air valve is mounted in housing or casing 39, and this valve constitutes an important feature of the rear valve mechanism. Air under 90 pounds pressure passes thru inlet connection 22″ past pipe 22, and thence into chamber 23 at the right of valve casing 39, as the structure is shown in the drawings.

Piston 40 is carried by square stem 41 extending horizontally, the neutral position of this piston being illustrated in Figure 5, where a by-pass 42 is open around the piston when the latter is in the aforesaid neutral position.

A guide piston or disk 43 is also carried by stem 41, and this assembly is movable longitudinally under air pressure, and is held in the normal position of Figure 5 (when the air pressure permits), by springs 44, 45, of equal capacity, and surrounding pins 46 and 47. These pins have tapering ends 48 entering recesses in the pistons 40 and 43, the opposite ends of the pins being adjustably mounted in tubular threaded bearings in the end walls of the housing 39.

A slide valve 50 (Figures 5 and 8) operates within a square opening 51 in a valve mounting element 52, providing a valve seat and a spring 53 holds the valve to seat. Square shaft 41 extends thru the slide valve and longitudinally thereof.

Port 54 in the valve 50 is adapted to register with ports 54′ and 54″ in the element or valve seat 52, and port 55 in the valve seat is adapted to register with ports 55′ and 55″ in the element 52.

Port 54′ is in communication with exhaust port 57 and port 54″ is in communication with pipe 58 connected with tank 32 and with pipe 59 communicating with housing 60, the latter having a chamber 61 about piston 62, and a chamber 63 below this piston. A valve 64 is carried by stem 65 of this piston, and the valve is tapered, providing for the gradual openings thereof to exhaust 66.

Chamber 61 above control piston 62 is connected thru port 68 with pressure pipe 70 having communication with brake pipe stem, and chamber 63 below control piston 62 is connected thru port 69 with pipe 70.

Chamber 61 is further connected with pipe 75 controlled by conductor's valve 76 constituting a brake application valve, a conductor's brake release valve 77 controlling pipe 78 communicating with pipe 79 between housing 39 and reserve air tank 30. The several tanks 30, 31, 32, 33, and various connections have already been referred to.

When the engineer desires to apply the brakes, he moves the handle of the automatic brake valve, not shown, to lap position, and then moves the handle 13 of the present apparatus for throwing valve 11 from the running position of Figures 1 and 2 to the application position of Figure 3, and pipe 22 in which the pressure is 90 pounds is placed in communication with exhaust port 24 of Figure 3 and exhaust pipe 24′ of Figure 1.

Air is thereby exhausted from chamber 23 at the right of the main valve at the rear of the train, this valve being in valve casing 39 of Figures 1 and 5. Air under pressure from the chamber at the left of piston 40 (and from tank 30) causes piston 40 to move to the right as in Figure 6, closing by-pass 42, and slide valve 50 moves with the piston, being mounted between the latter and guide piston 43, and being loose with reference to square shaft 41.

Relief port or exhaust port 54 permits air to pass from chamber 61 above piston 62 of the control valve 64, the air flowing thru pipe 59, ports 54″, 54, and 54′ to exhaust 57. (Air from the chamber on the left side of piston 40 is also permitted to exhaust at 50′.)

The pressure below piston 62, from the pipe 70 and brake pipe 10 then exceeds pressure above piston 62 and valve 64 moved by piston 62 opens, reducing pressure in brake pipe or train pipe 10, to the extent determined by the engineer in the operation of his valve 11 by handle 13, when applying the brakes,—first at the rear of the train and then on each car in succession, toward the forward end of the train.

The same control of valve 64 may be obtained by the conductor or any one authorized to operate the apparatus at the rear of the train, by opening valve 76 and thereby relieving pressure above piston 62, permitting this piston and valve 64 connected therewith to rise, for reducing pressure in pipe 70 and train pipe 10.

When releasing the brakes, either before or after the train stops, the engineer moves his rear control operating valve to the release position of Figure 4, and air flows from the main reservoir, not shown, thru pipe 14 and port 25 of valve 11 to port 21 and pipe 22.

Pressure is restored in chamber 23 at the right of piston 40 and the latter moves to the left, thus closing port 54 and opening port 55 thru slide valve 50, allowing air to flow as in Figure 7, from supplemental tank 33 (previously supplied from pipe 34 and pipe 22). Air thus passes thru pipes 81 and 82 in the direction indicated by the arrows of Figure 7 and to train line or brake pipe 10.

Slide valve 50 and piston 40 move to the release position of Figure 5, because of the flow of air from chamber 23 thru by-pass 42′ to the chamber at the left of piston 40, equalizing the air pressure and allowing springs 44, 45 having the same capacity, to determine the position of the valves here referred to—this being normal position. The conductor's brake release valve 77 may be employed when necessary or desirable.

Valve 77 is of importance in that it enables the conductor to avoid trouble on curves, and under other similar conditions where the engineer may not be able to see the rear portion of the train at all times, or may not know the exact conditions existing. The conductor may operate his valve 77 and relieve pressure from the reservoir and on the left side of piston 40. Air pressure on the right side being greater, piston 40 moves to release position, establishing communication between reservoir 33, pipe 81, port 55", space 55, port 55', pipe 82, and the brake pipe,— thus increasing brake pipe pressure and moving the triple pistons to release position. When brake pipe pressure is within five pounds of the maximum pressure, the conductor will close his valve. When the train is made up in the yard, with the train brake pipe charged, the air-brake inspectors may test the brakes, by applying them with valve 76 and releasing them with valve 77, and any car showing defective brakes can be eliminated. This test can be made before the engine is attached to the train. If it does not assure the engineman of the condition of the train, he must make his own test before leaving the yard.

The release of the brakes takes effect from the caboose or rear car to the forward end of the train, and if quicker release is desired the engineer moves his automatic brake valve to full release position, momentarily, until the required effect is produced.

The operation of the rear brake control apparatus does not interfere with the operation of the automatic brake valve, but the brakes can be released with the rear brake control mechanism after the application of the brakes with the automatic brake valve.

In Figure 7 showing the slide valve and piston at the extreme left, I have illustrated a modified form of valve operating device which includes coils 85 adapted for connection with a source of current and a switch, not illustrated, these coils constituting solenoids acting on stems 87 of pistons 40' and 43'. Springs 86 attached to the pistons are seated in grooved annular devices 88 of insulation and threaded into the casing.

The energization of one of the solenoids moves the pistons and slide valve in the required direction for applying the brakes, the other effecting movement in the direction required for releasing the brakes. The air connections for the slide valve and for valve 64 remain the same as before.

It is the intention that the supplemental air tanks at the rear of the train shall be of sufficient capacity to provide a large volume of air at that point, from pipe 10 thru check valve 35, insuring even and quick release of the brakes for the application thereof from either end of the train. This reserve air supply is also available in the event that the supply directly from the engine fails, thereby providing a margin of safety. In the event that the conductor at the rear of the train cannot easily communicate with the engineer, he may apply the brakes directly by the use of his valve in the caboose, and then determine by the air gage at that point what reduction of pressure is needed. The brakes may be applied also by the use of an emergency valve in each car of the train, these valves being connected with pipe 22, by means of branch pipes. When the brakes are applied in either manner, the engineer notices the drop in air pressure on his gage, and places the handle of his automatic valve on lap position, holding it there until the train stops.

When the brakes are applied gradually from the rear portion of the train, the slack between cars is taken up car by car from the rear end toward the engine, and the latter is taking up slack in the opposite direction, so that there is a continuous chain of cars under tension, and if there is a defective triple valve on any car and the brakes of that car are not applied, there is no tendency to "run in and out", as the slack is taken up before the triple valve comes into action. The rough handling of the brakes by the engineer is avoided, and the damage to or wear and tear on equipment is materially reduced.

Having described the invention what is claimed is:—

1. In air brake control mechanism, an engineer's operating valve, a brake pipe adapted to extend the length of a train, a control apparatus at the rear of the train and connected with the brake pipe, a pipe connected with the operating valve and with the control apparatus at the rear, permitting the engineer to reduce pressure in the rear control apparatus and brake pipe, initially at the rear of the train, and thence forwardly toward the engine, and means permitting pressure reduction in the rear control apparatus and brake pipe independently of the engineer's operating valve.

2. In air brake control mechanism, an engineer's operating valve, a brake pipe adapted to extend the length of a train, a control apparatus at the rear of the train and connected with the brake pipe, a pipe connecting the operating valve and the control apparatus at the rear, said apparatus last named including a valve operable from the engineer's valve, and a piston controlled valve for relieving pressure in the train pipe by the operation of the second named valve.

3. In air brake control mechanism, an engineer's operating valve, a brake pipe adapted to extend the length of a train, a control apparatus at the rear of the train and connected with the brake pipe, a pipe connecting the operating valve and the control apparatus at the rear, said apparatus last named including a resiliently held and fluid pressure controlled valve operable from the engineer's valve, and a piston controlled valve for relieving pressure in the train pipe by the operation of the resiliently held valve.

4. In air brake control mechanism, a brake pipe adapted for connection with brake apparatus on each car of a train, a piston operated control valve at the rear of the train, this valve determining the pressure in the brake pipe, a casing for the valve, means providing direct and reserve air supply to one side of the piston, and a main valve for relieving this air pressure, allowing the piston to open the control valve and reduce brake pipe pressure.

5. In air brake control mechanism, a brake pipe adapted for connection with brake apparatus on each car of a train, a piston operated control valve at the rear of the train, this valve determining the pressure in the brake pipe, a casing for the valve, means providing direct and reserve air supply to one side of the piston, and a main valve for relieving this air pressure, allowing the piston to open the control valve and reduce brake pipe pressure, and an engineer's operating valve and connections for determining the position of the main valve from the engineer's valve.

6. In air brake control mechanism, a brake pipe adapted for connection with brake apparatus on each car of a train, a piston operated control valve at the rear of the train, this valve determining the pressure in the brake pipe, a casing for the valve, means providing direct and reserve air supply to one side of the piston, and a main valve for relieving this air pressure, allowing the piston to open the control valve and reduce brake pipe pressure, said main valve including a casing and means for supplying direct and reserve air pressure to the casing.

7. In air brake control mechanism, a brake pipe adapted for connection with brake apparatus on each car of a train, a piston operated control valve at the rear of the train, this valve determining the pressure in the brake pipe, a casing for the valve, means providing direct and reserve air supply to one side of the piston, and a main valve for relieving this air pressure, allowing the piston to open the control valve and reduce brake pipe pressure, and a resiliently controlled and air controlled piston for operating the main valve.

8. In air brake control mechanism, a brake pipe adapted for connection with brake apparatus on each car of a train, a piston operated control valve at the rear of the train, this valve determining the pressure in the brake pipe, a casing for the valve, means providing direct and reserve air supply to one side of the piston, and a main valve for relieving this air pressure, allowing the piston to open the control valve and reduce brake pipe pressure, and connections for restoring the main valve to normal position.

9. In air brake control mechanism, a brake pipe adapted for connection with brake apparatus on each car of a train, a piston operated control valve at the rear of the train, and including a housing having communication with the brake pipe, this valve determining the pressure in the brake pipe, a main valve at the rear of the train, a casing for this valve last named, adapted to be placed in communication with the control valve at the rear of the train, for reducing pressure on one side of the piston, allowing the control valve to open and reduce pressure in the brake pipe, and means for effecting movement of the main valve for reducing pressure on the control valve.

10. In a brake control mechanism, a brake pipe adapted to extend the length of the train, a control valve assembly connected with the rear portion of the brake pipe and comprising a housing having a port communicating with the brake pipe, a valve member controlling the port, a piston within the housing and controlling the valve member, means admitting air to the housing on opposite sides of the piston, and means for reducing pressure above the piston permitting said piston to open the valve to the brake pipe.

11. In a brake control mechanism, a brake pipe adapted to extend the length of a train, a control valve assembly connected with the rear portion of the brake pipe and comprising a housing having a port communicating with the brake pipe, a valve member controlling the port, a piston within the housing and controlling the valve member, means admitting air to the housing on opposite sides of the piston, and air controlled means for reducing pressure above the piston permitting said piston to open the valve to the brake pipe.

12. In a brake control mechanism, a brake pipe adapted to extend the length of a train, a control valve assembly connected with the rear portion of the brake pipe and comprising a housing having a port communicating with the brake pipe, a valve member controlling the port, a piston within the housing and controlling the valve member, means admitting air to the housing on opposite sides of the piston, and air controlled means operable from a plurality of different points for reducing pressure above the piston permitting said piston to open the valve to the brake pipe.

13. In a brake control mechanism, a brake pipe adapted to extend the length of a train, a control valve assembly connected with the rear portion of the brake pipe and comprising a housing having a port communicating with the brake pipe, a valve member controlling the port, a piston within the housing and controlling the valve member, means admitting air to the housing on opposite sides of the piston, and means for reducing pressure above the piston permitting said piston to open the valve to the brake pipe, said means last named including a slide valve, a housing for the valve, and a resiliently mounted piston thru which movement is imparted to the slide valve.

In testimony whereof I affix my signature.

JOHN JULIANO.